United States Patent [19]

Hamy et al.

[11] Patent Number: 5,316,270
[45] Date of Patent: May 31, 1994

[54] DEVICE FOR THE CHARGING OF MATERIALS INTO A FURNACE AND THE PREHEATING OF THESE

[75] Inventors: Michel Hamy, Strasbourg; Christian Lebrun; Jean-Michel Thebault, both of Valenciennes; Ghislain Maurer, Chatel Saint Germain; Jacques Michelet, Longeville-lès-Metz; Jean-Luc Roth, Metz, all of France

[73] Assignee: Institut de Recerches de la Siderurgie Francaise (Irsid en Abrege), Paris, France

[21] Appl. No.: 589,451

[22] Filed: Sep. 27, 1990

[30] Foreign Application Priority Data

Sep. 28, 1989 [FR] France .................................. 89 13047

[51] Int. Cl.⁵ .............................................. C21C 5/40
[52] U.S. Cl. .................... 266/159; 266/207; 266/901
[58] Field of Search ................ 75/10.38, 581; 266/44, 266/144, 176, 159, 901, 207, 175, 177, 181, 155

[56] References Cited

U.S. PATENT DOCUMENTS 3,667,747 6/1972 Graybill .

4,290,800 9/1981 Sensis et al. ...................... 75/10.38
4,606,530 8/1986 Litchinko et al. .................. 266/901

FOREIGN PATENT DOCUMENTS 0161950 3/1985 European Pat. Off. .
2747499 10/1977 Fed. Rep. of Germany .
2328046 10/1975 France .
517873 8/1938 United Kingdom .

*Primary Examiner*—Melvyn J. Andrews
*Attorney, Agent, or Firm*—Fay, Sharpe, Beall, Fagan, Minnich & McKee

[57] ABSTRACT

The device for charging metalliferous materials 7 into a furnace 3 comprises a charging tube 1, inside which are arranged supports 8 distributed over an entire non-straight section of this, for example similarly to the stairs of a flight of stairs descending towards the furnace. Passages are provided between the supports 8, and means 10 for the vibration of the supports are provided.

The materials progressively descend on the supports 8 towards the furnace and are simultaneously preheated by the hot gases introduced into the tube, circulating through the materials and via the passages 9 and extracted via the outlet orifice 5.

7 Claims, 2 Drawing Sheets

DEVICE FOR THE CHARGING OF MATERIALS INTO A FURNACE AND THE PREHEATING OF THESE

The present invention relates to the charging of solid metalliferous materials in bulk, for example scrap iron, into a metallurgical furnace, such as an arc furnace, and to the preheating of these materials.

It is known that the smoke caused by the melting of the charged materials can be used for preheating the materials before they are introduced into the furnace. In particular, where arc furnaces are concerned, it is known to introduce a first batch of scrap into the furnace and then to begin the melting of this, the resulting hot smoke being intercepted and directed so at to circulate through the scrap of a second batch and thus preheated. This second batch can subsequently be introduced into the furnace either as a whole after the first scrap has melted or continuously in proportion as the melting takes place.

This process is useful especially in that it saves energy by partially recovering the heat from the smoke and by avoiding the need to open the furnace roof, leading to a loss of energy, in order to introduce the second batch.

For carrying out this type of process, there are known, for example, from the document FR 2,328,046, charging devices consisting of a tube inclined relative to the horizontal, opening out in its lower part above the furnace and driven in rotation on its axis. The batch is introduced in the upper part of the tube and, as a result of its rotation and inclination, progressively descends in this. During this time, hot gases circulate in the opposite direction in the tube and heat the materials. However, because the materials remain in contact with the wall of the tube in its lower part by gravity, the efficiency of the direct heat exchanges between the gases and materials is only low.

According to another known process, the batch is maintained as a whole above the furnace, and the hot gases or smoke pass through it. In this case, however, it is difficult to pass all the smoke through the batch and heat this uniformly. Supporting means and the large quantity of materials gathered together as a whole in this way generate a loss of head in the discharge of the smoke which is detrimental to the smooth operation of the furnace. Moreover, this solution makes it virtually impossible to introduce the materials of the batch into the furnace progressively.

The object of the present invention is to overcome these various disadvantages and allow an especially continuous charging of the preheated materials, with the maximum thermal energy of the smoke being recovered at the same time.

With this object in view, one subject of the invention is a process for charging solid metalliferous materials in bulk into a metallurgical furnace, such as an arc furnace, according to which at least some of the said materials are charged into the furnace, and hot gases are made to pass through these materials before they are introduced into the furnace, so as to preheat them. According to the invention, this process is characterized in that the charging materials are distributed in a tube, one end of which opens out above the furnace and at the other end of which the said materials are introduced, the materials being distributed in the form of at least one layer oriented according to a non-straight cross-section of the tube, in such a way that they occupy the said cross-section substantially completely.

As will have certainly already been understood, the principle of the invention involves distributing the materials in the charging tube in the form of a layer of substantially uniform thickness, in such a way that the heat exchanges with the hot gases are made easier, and forcing all the hot gases to pass through the batch of materials by arranging these materials according to a non-straight cross-section of the tube, that is to say in such a way that they are distributed over a larger area than the straight cross-section of the said tube. According to a particular arrangement of the invention, in order to distribute the materials, they are moved over a plurality of supports distributed along the length of the tube at levels decreasing progressively in the direction of the furnace, at the same time causing these supports to vibrate in such a way that the materials located on a support progressively overflow onto the support located immediately downstream in the direction of the furnace, and in order to preheat the said materials the said hot gases are circulated in the tube, at the same time being passed through gaps provided for this purpose between the supports.

In this particular arrangement, the desired distribution of the materials is obtained by spreading them on the supports, and the losses of head of the gases are limited by the gaps between the supports. An additional improvement in the efficiency of the heat exchanges between the hot gases and the materials is afforded because, when they fall from one support onto the next, that it is say in the region of the said gaps, the materials are "coated" completely by the moving gases, this not occurring when, as in the known systems, the materials remain in contact with the wall of the charging tube.

According to another particular arrangement of the invention, the hot gases consist of the smoke generated in the furnace during the melting of the materials already introduced into it.

Another subject of the invention is a device for the especially continuous charging of materials into a metallurgical vessel and for the preheating of these materials, of the type comprising a charging tube opening out at one end above the furnace and at its other end having an orifice for introducing the said materials into the tube. According to the invention, this device is characterized in that it possesses means for supporting the materials arranged in the tube according to at least one non-straight section of the latter and distributed over substantially this entire section, means for driving the materials on the supporting means in the direction of the furnace and passages provided in/or between these supporting means to allow the hot gases to circulate from one end of the tube to the other.

According to a particular arrangement, the supporting means consist of substantially flat elements arranged similarly to the stairs of a flight of stairs descending towards the furnace, the passages for the hot gases being provided between the said flat elements.

To cause the materials to move towards the furnace, the device preferably possesses means for the vibration of the said flat stair-shaped elements which can be inclined slightly towards the furnace, so as to cause the materials to fall from the stair on which they are located, onto the adjacent lower stair.

It is stated specifically that the expression "continuous charging" of course embraces any method of charging according to which the component materials of the batch are not introduced all at once, and relates, for example, to a charging by successive introductions, slightly staggered in time, of small quantities of these materials.

Other characteristics and advantages will emerge from the following exemplary description of a process and device according to the invention for the preheating of scrap iron and the continuous charging of this into a direct-current arc furnace.

Reference will be made to the accompanying drawings in which.

Figure 1:
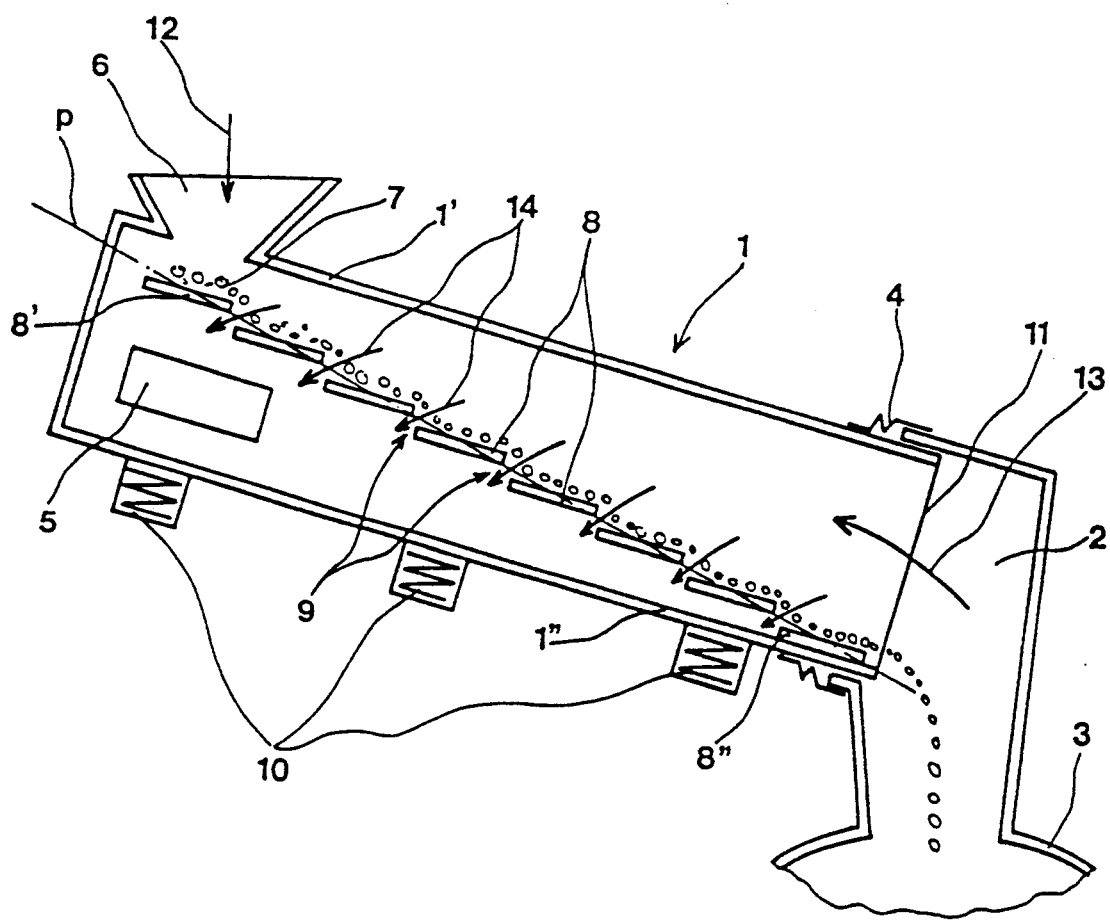
FIG. 1 shows diagrammatically, in longitudinal section, the charging device and the upper part of the arc furnace.

The charging device consists of a tube or tubular tunnel 1 of preferably rectangular cross-section. This tube is inclined slightly relative to the horizontal and opens out at its open lower end 11 above the furnace (not shown) into a conduit 2 connected to the roof 3 of the furnace. Sealing means 4 are provided between the tube 1 and the conduit 2. Towards its upper end 12, the tube has a smoke outlet orifice 5 and a hopper 6 for feeding scrap iron 7 which is arranged above the tube 1.

The wall of the tube 1 is preferably cooled, for example by the circulation of water, and/or consists of or is internally covered with refractory material which can limit the thermal losses.

Inside the tube, boards 8 cooled or made of refractory material are arranged in an oblique plane P sloping towards the furnace, similarly to the stairs of a flight of stairs, and extend transversely over substantially the entire width of the tube. The board 8' forming the upper stair is located under the hopper 6 in the vicinity of the upper wall 1' of the tube. The board 8" forming the lower stair is near the lower wall 1" of the tube at the lower end 11 of the latter.

The other boards 8 are arranged with a uniform spacing between the upper board 8' and the lower board 8", thus forming an assembly of boards distributed over an entire oblique section of the tube in the plane P, the orifice 11 of the tube 1 opening into the furnace and the smoke outlet orifice 5 being located on either side of this plane P. Spaces 9 are provided between two adjacent boards, at the locations corresponding to the risers of the flight of stairs formed by the assembly of boards.

The tube 1 is equipped with vibration generators 10 for causing the tube as a whole and therefore the boards connected rigidly to it vibrate. Alternatively, the boards 8 need not be fastened rigid to the tube 1, in which case the vibration generators are arranged so as to act only on the boards.

A typical operation of charging scrap iron into an arc furnace by means of the above-described device will now be described.

As is well known, the charging of an arc furnace usually takes place in a plurality of stages. When the furnace is empty, a first batch or basket of scrap iron is introduced into the furnace, the roof of the latter then being open. The furnace is then closed again by replacing the roof on this, and the electrodes are supplied with electrical current and brought into contact with the scrap in order to generate the arcs causing the melting of the scrap contained in the furnace. When the scrap of the first batch is at least partially melted, the following batches are introduced into the furnace.

This is when the process according to the invention for the continuous charging of scrap iron comes into effect.

The scrap is introduced into the tube 1 via the hopper 6 according to the arrow 12. It is deposited on the first board 8'. As a result of the vibrations of the boards generated by the vibration generators 10, the scrap falls onto the next board, and so on and so forth as far as the lower end of the tube from where it falls into the furnace. Simultaneously, the smoke coming from the furnace and intercepted by the conduit 2 circulates in a tube 1 according to the arrow 13 in counterflow with the movement of the scrap and leave it via the orifice 5 which can be connected to a smoke extraction device. The hot smoke is thereby forced to pass through the spaces 9 provided between the boards 8, as represented by the arrows 14, and heats the scrap located on each board of relatively small thickness, thus assisting the heat exchange between the smoke and scrap. The mean thickness of the layer of scrap depends particularly on the nature of this, the dimensions and inclinations of the tube and boards and the intensity of the vibrations. This thickness must be compatible with the losses of head allowed for the extraction of the smoke.

Furthermore, in the region of the spaces 9, the hot smoke completely envelops the scrap which falls from one board onto the other, the heat exchange therefore being further improved in these places.

Thus, the scrap enters the furnace continuously and preheated. Moreover, as a result of the arrangement of the boards in the tube, virtually all the smoke passing through the tube is brought into contact with the scrap, thereby making it possible to recover a maximum of their thermal energy.

By means of the process and device according to the invention, it is possible, for example, to make an energy saving of 60 kWh per ton of liquid metal in comparison with a use of non-preheated scrap.

Furthermore, since the scrap is already hot when introduced into the furnace, the time necessary for melting it is reduced and the productivity of the installation is increased.

The process according to the invention is especially suitable for the charging of direct-current arc furnaces with at least two roof electrodes. In this case, in fact, the fall of preheated scrap into the furnace can be directed at a point located between the electrodes of the same polarity, that is to say, as is known, at the point where the energy of the electric arcs tends to be concentrated. The scrap falling continuously at this location is thus melted rapidly, thereby preventing it from accumulating in still solid form.

The invention is not limited to the device and process described above by way of example. In particular, the design of the boards can be modified in so far as this allows the scrap to move from the hopper to the outlet end of the tube over an entire cross-section of the tube, and in so far as all or at least a large proportion of the hot gases or smoke is made to pass through the layer of scrap so formed.

For example, the tube can be substantially horizontal and the various boards inclined in the direction of the furnace, means then preferably being provided to ensure the extraction of the smoke via the outlet orifice 5, which can also be carried out in the front wall of the tube located opposite its outlet end 11.

The materials can also be distributed according to a plurality of non-straight sections of the tube, for example by arranging one or more assembly supports similar to the supports 8 in planes substantially parallel to the plane P, and by adapting the tube accordingly (a material charging orifice for each assembly of supports is provided and a passage is reserved at the bottom of the assembly or assemblies of supports nearest the furnace, so as to allow the passage of the materials coming from the assemblies of supports furthest away from the furnace).

Figure 2:
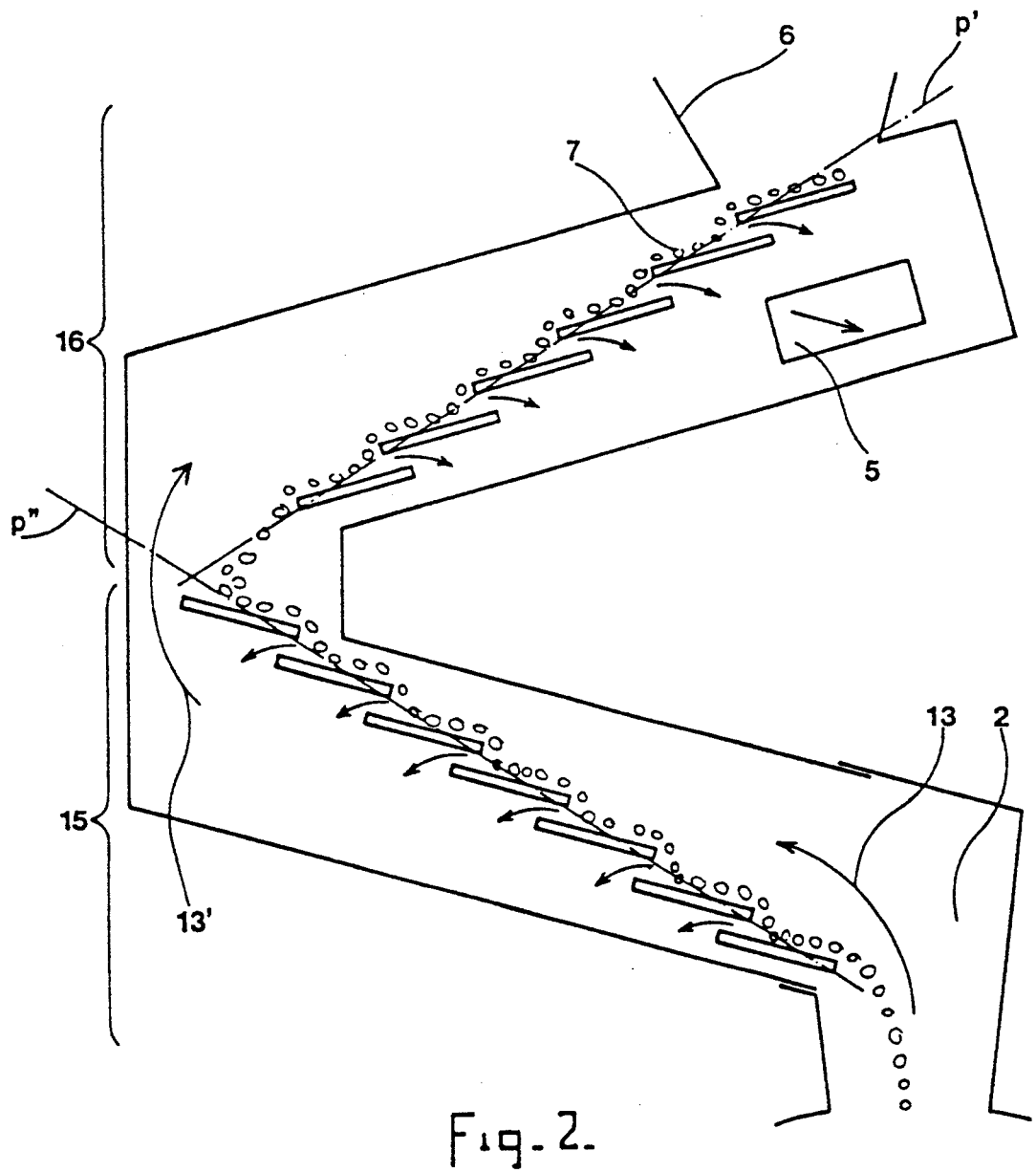
FIG. 2 is a diagrammatic view of an alternative version of this device.

As shown in FIG. 2, the supports can also be arranged not in a single plane P, but in a plurality of secant planes P', P'', in the manner of stairs comprising a plurality of flights of stairs alternately in one direction and then the other, each of these flights of stairs being arranged in a tube portion, and the various tube portions being connected successively to one another.

In this version, not only the overall lateral size of the charging device can be reduced, but also the overall efficiency of the heat exchanges is improved, because the residual thermal energy of the smoke 13' after the first exchange with the scrap in the lower zone 15 is reused in the upper zone 16.

According to yet another alternative version, a plurality of charging devices, such as those just described, can be associated "in parallel", the tubes of each device converging towards the charging orifice of the furnace.

We claim:

1. A device for preheating and continuously loading metal scraps into a metallurgical furnace, the device comprising:
    a tube inclined to a horizontal plane, said tube having an upper end and a lower end;
    a means for loading scraps into said upper end of said tube;
    a means for sealingly connecting said tube lower end to an opening in a roof of the furnace to allow for a flow of smoke from the furnace into said tube;
    a support structure mounted in said tube for supporting a layer of the scraps as the layer flows towards the furnace, said support structure being inclined in relation to said tube such that said support structure is more inclined to the horizontal plane than is said tube, said support structure extending from said tube upper end, under said means for loading scraps, towards said tube lower end;
    a means for driving the scraps on said support structure in the direction of the furnace;
    a plurality of gaps in said support structure, through which gaps the smoke can flow; and,
    an outlet orifice for the smoke, said outlet orifice being located in the tube below said support structure, so that the smoke flows from said tube lower end, through said gaps in said support structure to said outlet orifice.

2. The device of claim 1 wherein said support structure comprises a plurality of spaced support members.

3. Device according to claim 2, characterized in that said support members comprise substantially flat elements arranged similarly to the stairs of a flight of stairs descending towards the furnace, the gaps for the smoke being provided between said flat elements.

4. Device according to claim 2, wherein said means for driving the scraps comprises a means for the vibration of said support members.

5. Device according to claim 2, characterized in that said support members are inclined in the direction of the furnace.

6. Device according to claim 2, wherein said means for loading scraps comprises a hopper for charging the scrap, said hopper being located above an uppermost support member.

7. The device of claim 1 wherein said support structure comprises a plurality of spaced support elements which are arranged along a diagonal from said upper end of said tube to said lower end thereof so that said support elements substantially completely occupy said tube.

* * * * *